United States Patent [19]

Lehmann

[11] Patent Number: 4,494,199
[45] Date of Patent: Jan. 15, 1985

[54] BRAKE SYSTEM, ESPECIALLY FOR A MOTOR VEHICLE

[75] Inventor: Ulrich Lehmann, Weissach, Fed. Rep. of Germany

[73] Assignee: Dr. Ing. h.c.F. Porsche AG, Fed. Rep. of Germany

[21] Appl. No.: 418,682

[22] Filed: Sep. 16, 1982

[30] Foreign Application Priority Data

Sep. 18, 1981 [DE] Fed. Rep. of Germany ....... 3137207

[51] Int. Cl.³ ................................................ B60T 8/00
[52] U.S. Cl. .................................. 364/426; 180/197; 303/95; 361/238
[58] Field of Search .................... 364/426; 303/94, 95, 303/97, 100, 107, 108, 109; 361/238; 180/197

[56] References Cited

U.S. PATENT DOCUMENTS

| | | | |
|---|---|---|---|
| 3,519,805 | 7/1970 | Thorne-Booth | 364/426 |
| 3,639,754 | 2/1972 | Kovalick et al. | 364/426 X |
| 3,677,094 | 7/1972 | Kupfmuller | 364/426 X |
| 4,190,220 | 2/1980 | Hahn et al. | 364/426 X |
| 4,327,414 | 4/1982 | Klein | 364/426 |
| 4,367,529 | 1/1983 | Masclet et al. | 364/426 |
| 4,370,714 | 1/1983 | Rettich et al. | 364/426 |
| 4,380,799 | 4/1983 | Allard et al. | 364/426 |
| 4,404,633 | 9/1983 | Goicoechea | 364/426 |

OTHER PUBLICATIONS

Ito, "Control Engineering" Jan. 1961, pp. 90-93.

Primary Examiner—B. Dobeck
Assistant Examiner—Bentsu Ro
Attorney, Agent, or Firm—Craig & Burns

[57] ABSTRACT

A brake system with a control installation influencing the deceleration of the motor vehicle in such a manner that the deceleration of the vehicle takes place along a stored characteristic curve triggerable by a measuring element of the brake pedal.

11 Claims, 3 Drawing Figures

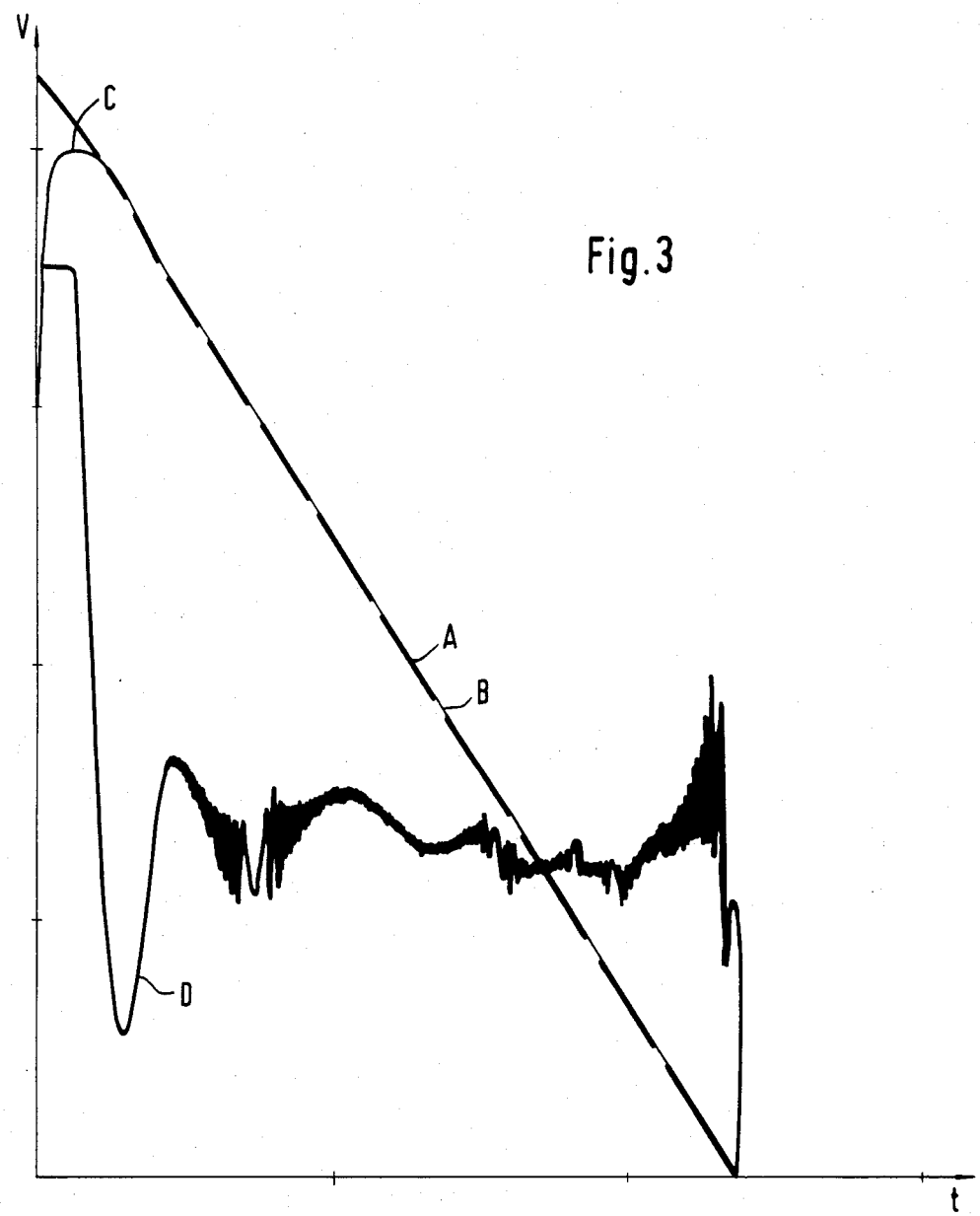

BRAKE SYSTEM, ESPECIALLY FOR A MOTOR VEHICLE

The present invention relates to a brake system, preferably for a motor vehicle, which includes a control installation influencing the deceleration of the motor vehicle and at least one friction brake.

In a known brake system of the aforementioned type, the vehicle deceleration is determined by rotational speed measurement at the output and by a differentiating device. This vehicle deceleration is compared with a rated or intended value, whereby this value serves for the control of the brake system. In this prior art construction, a high expenditure from an apparatus point of view is required for the measurement of the angular velocity and for the further processing of this magnitude for the control apparatus.

It is the aim of the present invention to provide a regulation for a brake system which, with good effectiveness, is realizable with simple means.

The underlying problems are solved according to the present invention in that the control installation and the brake system cooperate in such a manner that the deceleration of the vehicle takes place along a stored characteristic curve releasable by a measuring element of the brake pedal.

The advantages principally achieved with the present invention reside in that as a result of the deceleration of the vehicle along the stored characteristic curve releasable or triggerable by the measuring element of the brake pedal, a good functioning of the brake system is assured. The electronic components and circuit measures used therefor assure not only high operating safety and reliability and considerable service life but excel also by simplicity. As a result thereof, the possibility also exists by control completely satisfactorily a brake system consisting of a hydrodynamic brake and of a friction brake whose nonlinear influencing magnitudes normally impair an efficient cooperation. The desired delayed interconnection of the friction brake can be readily realized by means of a threshold pickup. Finally, it is additionally achieved by the electronic components and circuitry of the invention that the brake system has anti-blocking characteristics.

These and other objects, features and advantages of the present invention will become more apparent from the following description when taken in connection with the accompanying drawing which shows, for purposes of illustration only, two embodiments in accordance with the present invention, and wherein:

FIG. 3 is a diagram by means of which the operation of the brake system of the present invention is explained.

Figure 1:
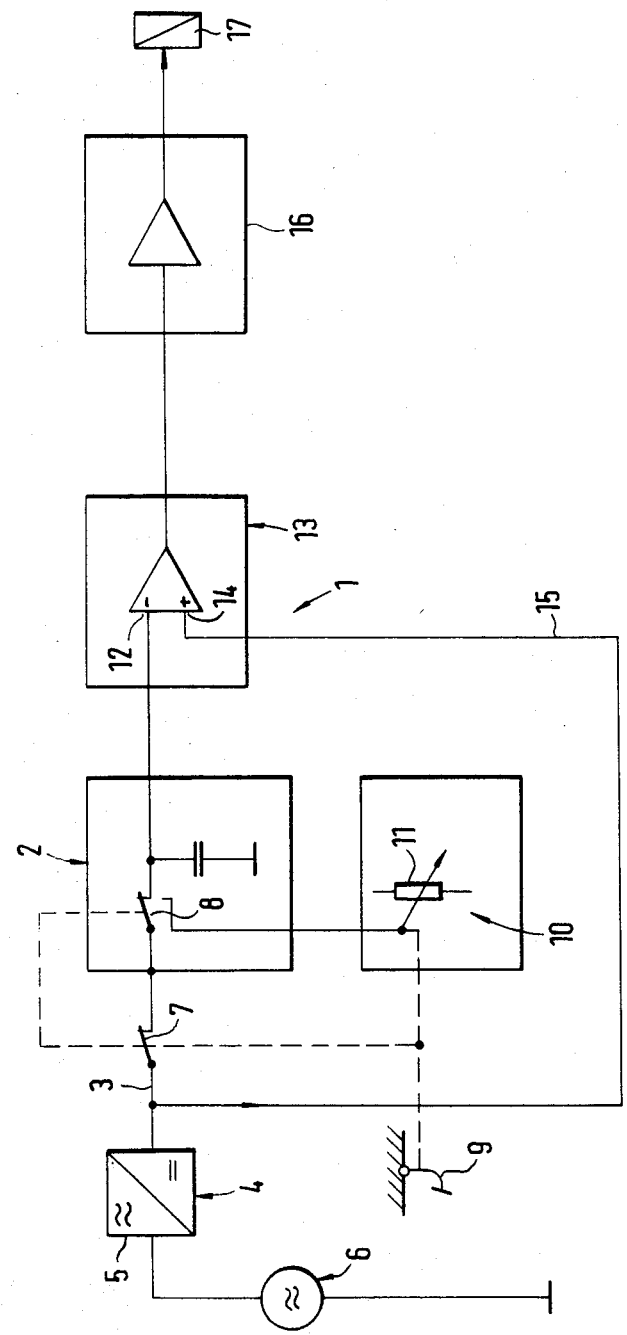
FIG. 1 is a schematic block diagram for the control of a brake system in accordance with the present invention.

Referring now to the drawing wherein like reference numerals are used throughout the various views to designate like parts, and more particularly to FIG. 1, a control installation generally designated by reference numeral 1 for a brake system, for example, for a motor vehicle, is illustrated in principle in this figure, which brake system includes at least one friction brake. The control installation 1 includes an integrator generally designated by reference numeral 2 which is connected by way of a line 3 with an element generally designated by reference numeral 4 producing a driving velocity voltage. The element 4 is formed by a rectifier 5 which is connected with a tachometer 6.

Switches 7 and 8 are arranged in the line 3 between the rectifier 5 and the integrator 2. The switches 7 and 8 are actuated in dependence of a brake pedal 9.

The brake pedal 9 is connected to a measuring element 10 which in the illustrated embodiment is a potentiometer 11. However, in lieu of this potentiometer, also a pressure pickup or transducer, mounted, for example, at the master brake cylinder, can be used.

The potentiometer 11 is connected by way of the switch 8 with the integrator 2 whose output is fed to a first input terminal 12 (minus) of a differential amplifier 13. A second input terminal 14 (plus) of the differential amplifier 13 is connected by means of a line 15 to the line 3 between the switch 7 and the rectifier 5 in bypassing relationship of the integrator 2.

The differential amplifier 13 is operatively connected with an amplifier 16 which, in turn, is connected to a servo valve 17.

If a vehicle (not shown) equipped with the control installation 1 is in motion, then the integrator 2 is charged constantly with the existing driving velocity voltage; the same potentials will result at the input terminals 12 and 14 and thus no output signal is produced in the differential amplifier 13. The storage magnitude and discharge velocity of the integrator 2 is determined by the weight and braking capability of the vehicle.

Upon actuation of the brake pedal 9, the driving velocity voltage is separated from the integrator 2 by way of the switch 7. At the same time, the integrator 2 is connected with the potentiometer 11. The now-initiated constant discharge of the integrator 2 produces a characteristic curve whose progress or shape is controlled by the brake pedal 9, respectively, by the potentiometer 11. A differential voltage will now result at the differential amplifier 13 between the output voltage of the integrator 2 and the driving velocity voltage, which differential voltage serves for the control of the friction brake by means of the amplifier 16 and the servo valve 17, i.e., the vehicle deceleration takes place along the characteristic curve of the integrator 2.

Figure 2:
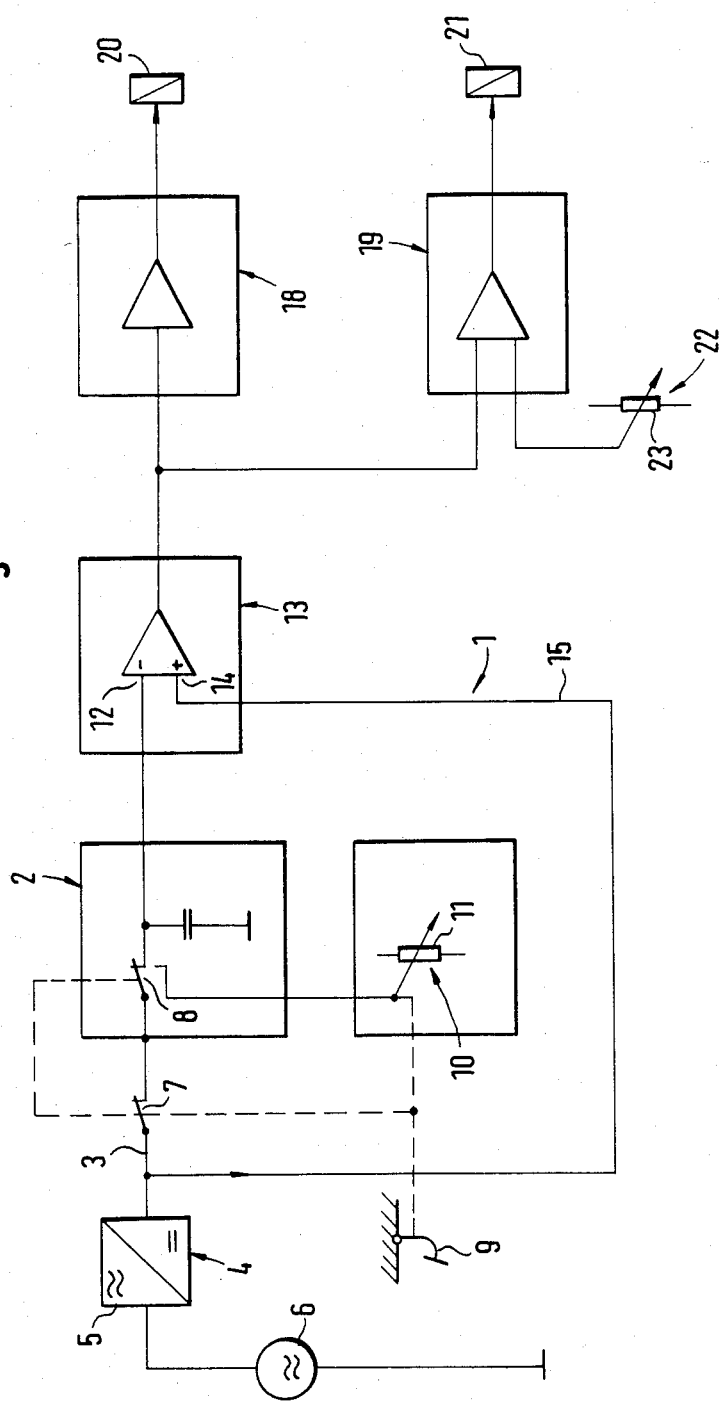
FIG. 2 is a schematic block diagram corresponding to FIG. 1 of a modified embodiment for the control of a brake system in accordance with the present invention.

According to FIG. 2, two amplifiers 18 and 19 are connected in the output of the differential amplifier 13 which, in turn, are connected with the servo valves 20 and 21.

The amplifier 18 and the servo valve 20 are connected with a hydrodynamic brake; the amplifier 19 and the servo valve 21, in turn, are connected to a friction brake.

A threshold element 22 is connected with the amplifier 19, which is formed by a potentiometer 23.

If the brake pedal 9 is actuated, then at first the hydrodynamic brake is controlled by means of the amplifier 18 and, more particularly, for such length of time until no deceleration takes place anymore by the hydrodynamic brake notwithstanding maximum braking control. A threshold value determined by or measured at the potentiometer 23 is now overcome and the amplifier 19 controls the friction brake.

As a result of these measures, the nonlinear influence magnitudes of the hydrodynamic brake and of the friction brake have no disadvantageous effects on a uniform deceleration progress of the vehicle to be braked.

The function of the brake system is illustrated by reference to the diagram shown in FIG. 3. The time t is plotted along the abscissa and the velocity V along the ordinate.

The curve A is the characteristic curve which is produced by the integrator 2 in dependence of the brake pedal 9. The line B extends along this line A which corresponds to the actual vehicle deceleration, i.e., the vehicle deceleration takes place along the characteristic curve (line A) of the integrator 2. The shape of the curve B at C illustrates the control process. The line D represents the braking forces occurring by means of the braking operation in accordance with the present invention.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A brake system which includes a control installation storing data representing a characteristic curve of vehicular deceleration for influencing the deceleration of a motor vehicle and at least one friction brake means, comprising
   measuring means for sensing the position of a brake pedal,
   means operatively connecting the control installation and the brake means for effecting deceleration of the vehicle in accordance with said stored characteristic curve and in response to the measuring means.

2. A brake system which includes a control installation storing data representing a characteristic curve of vehicular deceleration for influencing the deceleration of a motor vehicle and at least one friction brake means, comprising
   measuring means for sensing the position of a brake pedal,
   means operatively connecting the control installation and the brake means for effecting deceleration of the vehicle in accordance with said stored characteristic curve and in response to the measuring means,
   wherein the control installation includes an integrator responding in accordance with characteristic curve,
   means for supplying a vehicle velocity voltage to said integrator in response to said measuring means,
   a differential amplifier,
   a first input to the said differential amplifier operating in response to said integrator,
   a second input terminal of the differential amplifier operatively connected with the means supplying the driving velocity voltage in by passing relationship with respect to the integrator, and
   amplifier means operating in response to the differential amplifier for effecting control of the brake system.

3. A brake system according to claim 2, wherein the means supplying the driving velocity voltage includes a rectifier means operatively connected with a tachometer pickup.

4. A brake system according to claim 2 or 3, wherein said measuring means includes a potentiometer.

5. A brake system according to claim 2 or 3, wherein said measuring means includes a pressure transducer.

6. A brake system which, in addition to the friction brake means, includes a hydrodynamic brake means, according to claim 2 or 3, further comprising
   first amplifier means in response to said differential amplifier for controlling the hydrodynamic brake means and
   second amplifier means for controlling the friction brake means subsequent to the actuation of control of the hydrodynamic brake means.

7. A brake system according to claim 6, wherein the second amplifier means controls the friction brake in dependence on a threshold means.

8. A brake system according to claim 7, wherein said threshold means includes a potentiometer.

9. A vehicular system for sequential control of a plurality of brakes comprising
   means for storing a first signal representative of vehicular velocity,
   means responsive to said stored first signal and to the position of a brake pedal for transmitting a signal representative of a characteristic curve of vehicular velocity versus time,
   means comparing said stored transmitted signal with an unstored signal representing vehicular velocity for producing an output signal, and
   means for actuating at least one of said plurality of brakes in response to the output signal.

10. A vehicular system for sequential control of a plurality of brakes comprising
    means for storing a first signal representative of vehicular velocity,
    means responsive to said stored first signal and to the position of a brake pedal for transmitting a signal representative of a characteristic curve of vehicular velocity versus time,
    means comparing said stored transmitted signal with an unstored signal representing vehicular velocity for producing an output signal, and
    means for actuating at least one of said plurality of brakes in response to the output signal,
    wherein the plurality of brakes include at least a hydrodynamic brake and a first friction brake, and
    threshold means for establishing a condition for actuating the friction brake at a point in time different from the point in time at which said hydrodynamic brake is actuated, and
    said means for actuating said brakes comprising
    means responsive to said threshold means for operating at least one friction brake at a point in time different from the point in time at which the hydrodynamic brake is actuated.

11. A vehicular system in accordance with claim 10 wherein
    said means responsive to said threshold means is effective to operate said friction brake subsequent to the hydrodynamic brake.

* * * * *